June 28, 1949.  L. DORAN  2,474,728
REVERSIBLE BEARING

Filed Aug. 1, 1947  2 Sheets-Sheet 1

INVENTOR.
Lafayette Doran
BY Victor J. Evans & Co.
ATTORNEYS

INVENTOR.
Lafayette Doran

Patented June 28, 1949

2,474,728

UNITED STATES PATENT OFFICE 2,474,728

REVERSIBLE BEARING

Lafayette Doran, Scranton, Pa.

Application August 1, 1947, Serial No. 765,455

3 Claims. (Cl. 308—74)

This invention relates to shaft bearings.

It is an object of the present invention to provide a shaft bearing which has a plurality of bearing elements which are retained at circumferentially spaced locations about the shaft, below and above, and at opposite sides of the same and wherein there is provided space between elements to allow the shaft to be cooled and allow dust and dirt to collect without being ground into the bearing surface.

It is another object of the present invention to provide a shaft bearing wherein the several inserts are reversible so that when worn on one side, they can be reversed and worn on the other side and wherein the engagement of the shaft with the insert is at the corner of the insert so that by the use of a square insert, four different engaging edges for the shaft can be provided by the one insert.

Other objects of the present invention are to provide a shaft bearing which is of simple construction, inexpensive to manufacture, easy to assemble and disassemble for the purpose of changing the bearing insert, and efficient in operation.

For a better understanding of the invention, reference may be had to the following detailed description taken in connection with the accompanying drawing, in which Fig. 1 is an end elevational view of the bearing embodying the features of the present invention.

Figure 1:
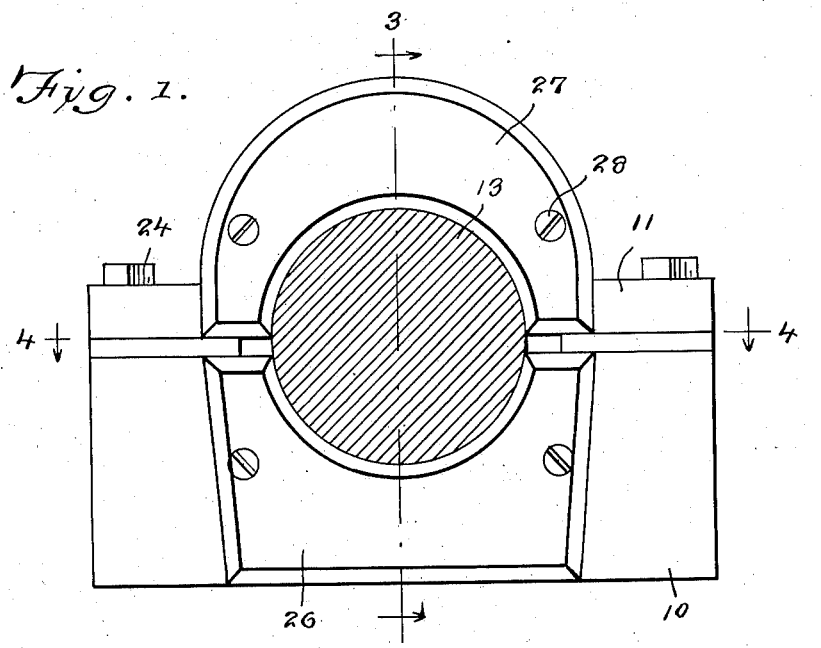
Figure 2:
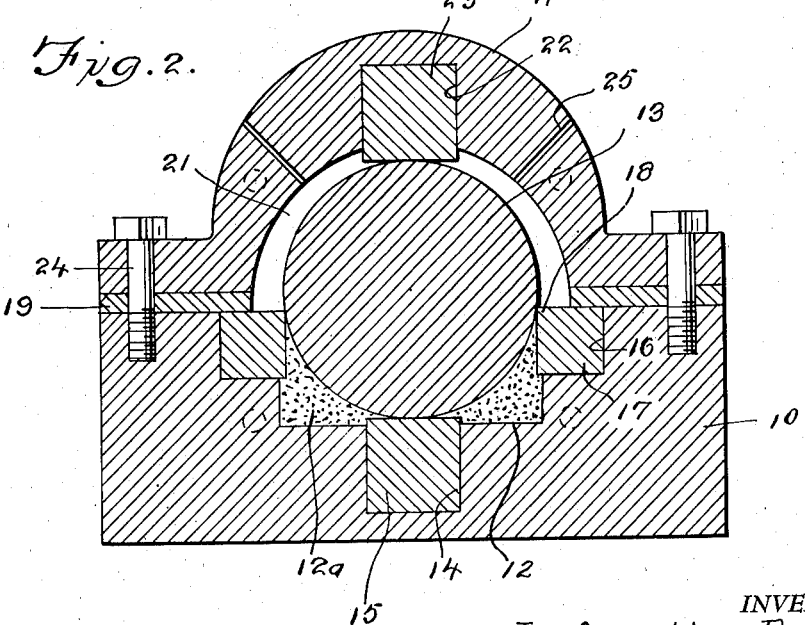
Fig. 2 is a transverse cross sectional view taken through the bearing.
Figure 3:
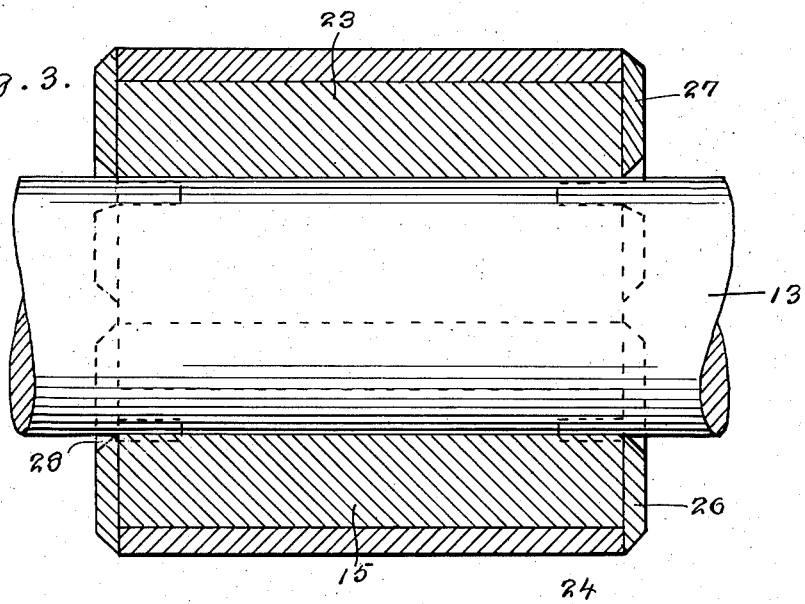
Fig. 3 is a cross-sectional and elevational view taken on line 3—3 of Fig. 1.
Figure 4:
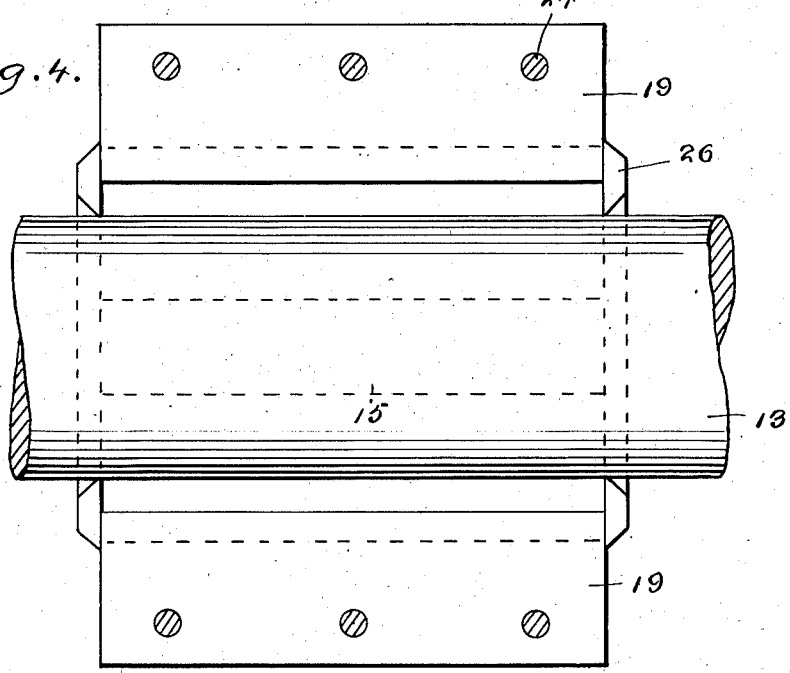
Fig. 4 is a plan view looking upon the top face of the gasket and the top face of the side bearing insert and of the shaft.

Referring now to the figures, 10 represents the lower half of the bearing and 11 represents the upper half of the bearing. The lower bearing half has a longitudinally extending opening 12 adapted to receive a shaft 13. In the bottom wall of this opening is a slot 14 in which is disposed a bottom bearing element 15 on which the shaft 13 will rest. In the sidewalls of the opening 12 are cut away recesses 16 in which are disposed respectively side bearing elements 17 adapted to have a corner engaged with the shaft 13 as indicated at 18. The corners 18 of the bearing elements 17 engage with the shaft at a level slightly below the center of the shaft and hence are disposed apart a distance less than the diameter of the shaft. As the corners 18 of the side bearing elements 17 become worn, the side bearing elements can be rotated so that other corners can be presented to the shaft surface. Within the space 12 there may be disposed oil packing 12a to contain the oil or lubricant for the bearing.

Likewise the bottom bearing element 15 can be rotated when worn to present another side to the bearing surface. On the bearing half 10, there is disposed a gasket 19 on which top half 11 of the bearing is rested. The top half of the bearing is relieved to provide a large air space 21 above the shaft 13 through which air may circulate to help keep the shaft and bearing cool. In the top of the bearing half is a recess 22 in which is disposed a top bearing insert 23. This bearing insert 23 is of square section and can be rotated and disposed in the recess 22 to present different sides to the shaft surface. The bearing halves are held together by machine screws 24. Air can enter the space 21 through air holes 25 in the top bearing half. The inserts are retained against longitudinal displacement within the bearing halves by plates 26 and 27 secured respectively to the ends of the bearing halves by fastening screws 28.

While various changes may be made in the detail construction, it shall be understood that such changes shall be within the spirit and scope of the present invention as defined by the appended claims.

I claim:

1. A bearing comprising top and bottom halves, the bottom half being recessed to receive packing material, the recess bottom wall being provided with a slot, a bearing insert in the slot, the recess sidewalls being cut away, and other bearing inserts disposed respectively in the cut away parts of the recess and providing for engagement with a shaft at the opposite sides of the same, and said top half of the bearing being secured to the bottom half.

2. A bearing comprising top and bottom halves, the bottom half being recessed to receive packing material, the recess bottom wall being provided with a slot, a bearing insert in the slot, the recess sidewalls being cut away, and other bearing inserts disposed respectively in the cut away parts of the recess and providing for engagement with a shaft at the opposite sides of the same, and said top half of the bearing being secured to the bottom half, said top half being relieved to provide air space over the top of the shaft and having a slot extending longitudinally thereof, a bearing insert within the slot of the top half and adapted to engage with the top of the shaft.

3. A bearing comprising top and bottom halves, the bottom half being recessed to receive packing material, the recess bottom wall being provided with a slot, a bearing insert in the slot, the recess sidewalls being cut away, and other bearing inserts disposed respectively in the cut away parts of the recess and providing for engagement with a shaft at the opposite sides of the same, and said top half of the bearing being secured to the bottom half, said side bearing insert being of square section and adapted to engage one corner at a time with the shaft surface, the engaging of the bearing corner being slightly below the axis of the shaft.

LAFAYETTE DORAN.

REFERENCES CITED

The following references are of record in the file of this patent:

UNITED STATES PATENTS

| Number | Name | Date |
|--------|------|------|
| 259,255 | Williams | June 6, 1882 |

FOREIGN PATENTS

| Number | Country | Date |
|--------|---------|------|
| 589,534 | Germany | Dec. 8, 1933 |